(12) United States Patent
Ebata et al.

(10) Patent No.: US 10,472,535 B2
(45) Date of Patent: Nov. 12, 2019

(54) METHOD FOR PRODUCING FLUORINATED COPOLYMER SOLUTION, AND COATING COMPOSITION

(71) Applicant: AGC Inc., Tokyo (JP)

(72) Inventors: Shiro Ebata, Tokyo (JP); Toshinori Tomita, Tokyo (JP); Masakazu Ataku, Tokyo (JP); Shun Saito, Tokyo (JP); Sho Masuda, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 14/674,565

(22) Filed: Mar. 31, 2015

(65) Prior Publication Data

US 2015/0203702 A1 Jul. 23, 2015

Related U.S. Application Data

(63) Continuation of application No. PCT/JP2013/076384, filed on Sep. 27, 2013.

(30) Foreign Application Priority Data

Oct. 3, 2012 (JP) ................. 2012-221128

(51) Int. Cl.
| | | |
|---|---|---|
| C09D 127/12 | (2006.01) | |
| C08F 214/18 | (2006.01) | |
| C08F 2/38 | (2006.01) | |
| C08K 5/3435 | (2006.01) | |

(52) U.S. Cl.
CPC .............. C09D 127/12 (2013.01); C08F 2/38 (2013.01); C08F 214/18 (2013.01); C08K 5/3435 (2013.01)

(58) Field of Classification Search
CPC ... C08K 5/3435; C09D 127/12; C08F 214/18; C08F 2/38
See application file for complete search history.

(56) References Cited

U.S. PATENT DOCUMENTS

2004/0225060 A1* 11/2004 Yamauchi ............... C08F 6/10
524/851

FOREIGN PATENT DOCUMENTS

| JP | 61-174210 | | 8/1986 |
|---|---|---|---|
| JP | 62-292814 | | 12/1987 |
| JP | 62292814 A | * | 12/1987 |
| JP | 4-139201 | | 5/1992 |
| JP | 4-216807 | | 8/1992 |
| JP | 4-366114 A | | 12/1992 |
| JP | 5-32725 A | | 2/1993 |
| JP | 5-117577 A | | 5/1993 |
| JP | 2541189 | | 10/1996 |
| JP | 2007177217 A | * | 7/2007 |
| JP | 2007-231164 | | 9/2007 |
| WO | WO 2003/051931 A1 | | 6/2003 |

OTHER PUBLICATIONS

Machine translation; JP 62-292814 A; Dec. 1987; Ooka et al.*
Machine translation; JP 2007-177217 A; Jul. 2007; Kageishi et al.*
International Search Report issued in International Application No. PCT/JP2013/076384, dated Dec. 24, 2013.

* cited by examiner

*Primary Examiner* — Karuna P Reddy

(74) *Attorney, Agent, or Firm* — Oblon, McClelland, Maier & Neustadt, L.L.P.

(57) ABSTRACT

A method for producing a fluorinated copolymer solution polymerizing a monomer mixture of a fluoro-olefin (A), a monomer (B) having a crosslinkable group and a monomer (C) having no fluorine atom and no crosslinkable group in the presence of an organic solvent and a compound having two or more piperidyl group represented by the formula (1):

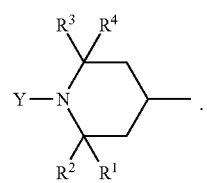

(1)

11 Claims, No Drawings

METHOD FOR PRODUCING FLUORINATED COPOLYMER SOLUTION, AND COATING COMPOSITION

This application is a continuation of PCT Application No. PCT/JP2013/076384, filed on Sep. 27, 2013, which is based upon and claims the benefit of priority from Japanese Patent Application No. 2012-221128 filed on Oct. 3, 2012. The contents of those applications are incorporated herein by reference in their entireties.

TECHNICAL FIELD

The present invention relates to a method for producing a fluorinated copolymer solution, a fluorinated copolymer solution obtained by the production method, and a coating composition containing such a fluorinated copolymer solution.

BACKGROUND ART

In the production of a fluorinated copolymer solution, there is a problem such that due to an inorganic acid component such as hydrofluoric acid formed in the polymerization step, the fluorinated copolymer solution is likely to lose stability during or after the polymerization, whereby gelation is likely to proceed, or the molecular weight is likely to increase.

Further, during the storage of the obtained fluorinated copolymer solution, the gelation or the increase of the molecular weight sometimes occurred and led to such a problem that the subsequent processing was difficult, or the miscibility with other components was adversely influenced.

Patent Document 1 discloses that at the time of polymerization for a fluorinated copolymer, an alkali metal carbonate is added to the polymerization system to neutralize an acid component formed during the polymerization thereby to facilitate a smooth progress of the polymerization and to improve the storage stability for a long period of time, of the fluorinated copolymer solution obtained by the polymerization.

However, in the method disclosed in Patent Document 1, it is required to remove the alkali metal carbonate by e.g. filtration after the polymerization, thus leading to such a problem that the production steps tend to be complex and long. Further, even if the alkali metal carbonate is removed, there still remain such a problem that an alkali metal carbonate dissolved in a very small amount will precipitate, whereby the transparency of the fluorinated copolymer solution will be lost.

Further, Patent Document 2 proposes to prevent gelation during polymerization by conducting the polymerization for a fluoro-olefin copolymer in the presence of a compound containing a 2,2,6,6-tetra-substituted piperidyl group.

However, in the method disclosed in Patent Document 2, there was a problem such that the storage stability of the obtained fluoro-olefin copolymer solution for a long period of time was inadequate.

Further, in the method disclosed in Patent Document 2, in a case where the obtained fluoro-olefin polymer solution is to be used as a coating composition, the dryability of the coating film is inadequate.

PRIOR ART DOCUMENTS

Patent Documents

Patent Document 1: JP-A-61-174210
Patent Document 2: JP-A-62-292814

DISCLOSURE OF INVENTION

Technical Problem

It is an object of the present invention to provide a method for producing a fluorinated copolymer solution having good storage stability and good dryability of a coating film when made into a coating composition.

Solution to Problem

In the present invention, the following constructions have been adopted in order to accomplish the above object. That is, the present invention provides the following.

[1] A method for producing a fluorinated copolymer solution, characterized by polymerizing a monomer mixture comprising a fluoro-olefin (A), a monomer (B) having a crosslinkable group and a monomer (C) having no fluorine atom and no crosslinkable group, in the presence of an organic solvent and a compound having a piperidyl group represented by the following formula (1), wherein the molar ratio of the total molar amount of piperidyl groups contained in the compound having a piperidyl group to the total molar amount of monomers in the monomer mixture, is from 0.00105 to 0.00380:

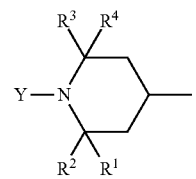

(1)

(in the formula (1), each of $R^1$, $R^2$, $R^3$ and $R^4$ which are independent of one another, is a hydrogen atom, a methyl group or a hydroxy group, and Y is a hydrogen atom, an oxy radical group, an alkyl group, an alkoxy group, an aryl group or a hydroxy group.).

[2] The method for producing a fluorinated copolymer solution according to the above [1], wherein in the formula (1), $R^1$, $R^2$, $R^3$ and $R^4$ are methyl groups, and Y is a methyl group or a hydrogen atom.

[3] The method for producing a fluorinated copolymer solution according to the above [1] or [2], wherein the compound having a piperidyl group is at least one member selected from the group consisting of bis(1,2,2,6,6-pentamethyl-4-piperidyl) sebacate represented by the following formula (2), bis(1,2,2,6,6-pentamethyl-4-piperidyl)[[3,5-bis(1,1-dimethylethyl)-4-hydroxyphenyl]methyl]butyl malonate represented by the following formula (3), and bis(2,2,6,6-tetramethyl-4-piperidyl) sebacate represented by the following formula (4):

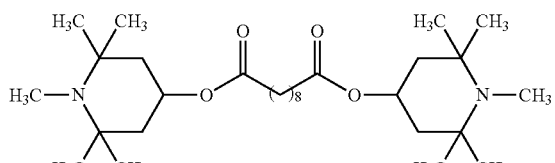
(2)

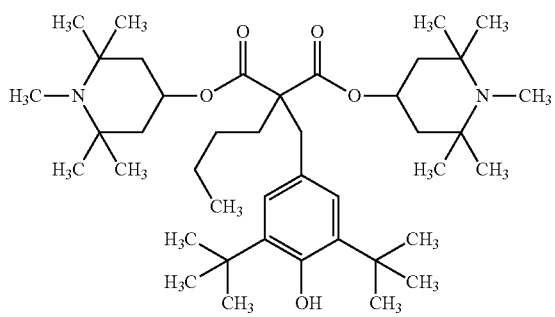
(3)

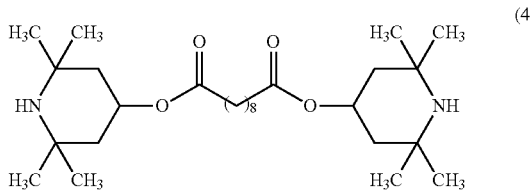
(4)

[4] The method for producing a fluorinated copolymer solution according to any one of the above [1] to [3], wherein to the total molar amount of monomers in the monomer mixture, the content of the fluoro-olefin (A) is from 25 to 70 mol %, the content of the monomer (B) having a crosslinkable group is from 1 to 70 mol %, the content of the monomer (C) having no fluorine atom and no crosslinkable group is from 1 to 70 mol %, and the total content of (A)+(B)+(C) is 100 mol %.

[5] The method for producing a fluorinated copolymer solution according to any one of the above [1] to [4], wherein the monomer (B) having a crosslinkable group is at least one member selected from the group consisting of an alkyl vinyl ether having a crosslinkable group, an alkyl allyl ether having a crosslinkable group, an alkanoic acid vinyl ester having a crosslinkable group, an alkanoic acid allyl ester having a crosslinkable group, and a (meth)acrylic acid ester having a crosslinkable group.

[6] The method for producing a fluorinated copolymer solution according to any one of the above [1] to [5], wherein the crosslinkable group is at least one member selected from the group consisting of a hydroxy group, a carboxy group, an epoxy group, an oxetanyl group, an amino group and an alkoxysilyl group.

[7] The method for producing a fluorinated copolymer solution according to any one of the above [1] to [6], wherein the monomer (C) having no fluorine atom and no crosslinkable group is at least one member selected from the group consisting of an alkyl vinyl ether, an alkyl allyl ether, an alkanoic acid vinyl ester, an alkanoic acid allyl ester and a (meth)acrylic acid alkyl ester.

[8] The method for producing a fluorinated copolymer solution according to any one of the above [1] to [7], wherein the polymerization is conducted in the presence of a radical polymerization initiator.

[9] The method for producing a fluorinated copolymer solution according to the above [8], wherein the radical polymerization initiator is a compound represented by the following formula (5):

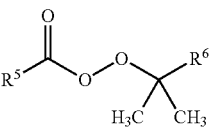
(5)

(in the formula (5), each of $R^5$ and $R^6$ which are independent of each other, is a $C_{1-12}$ alkyl group or a $C_{6-12}$ aryl group.).

[10] The method for producing a fluorinated copolymer solution according to the above [9], wherein $R^5$ in the formula (5) is a group represented by the following formula (6):

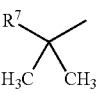
(6)

(in the formula (6), $R^7$ is a $C_{1-9}$ alkyl group.).

[11] The method for producing a fluorinated copolymer solution according to any one of the above [1] to [10], wherein the organic solvent is at least one member selected from the group consisting of xylene, ethanol, tert-butyl alcohol, acetone, methyl ethyl ketone, methyl isobutyl ketone, ethoxyethyl propionate, cyclohexanone, tert-butyl acetate, chlorobenzene trifluoride, mineral spirits, cyclohexane, ethyl acetate, butyl acetate, HCFC-141b and HCFC-225.

[12] A fluorinated copolymer solution produced by the method for producing a fluorinated copolymer solution as defined in any one of the above [1] to [11].

[13] A coating composition containing the fluorinated copolymer solution as defined in the above [12].

Advantageous Effects of Invention

According to the production method of the present invention, it is possible to obtain a fluorinated copolymer solution having good storage stability and good dryability of a coating film when made into a coating composition. Further, the coating composition of the present invention has good storage stability and good dryability of a coating film.

DESCRIPTION OF EMBODIMENTS

Now, the present invention will be described with reference to its embodiments, but it should be understood that the present invention is by no means restricted by exemplification in these embodiments. Further, in this specification, the expression "(meth)acrylic acid" represents either acrylic acid or methacrylic acid.

[Method for Producing Fluorinated Copolymer Solution]

According to the method for producing a fluorinated copolymer solution of the present invention, it is possible to obtain a fluorinated copolymer obtainable by polymerizing a monomer mixture comprising a fluoro-olefin (A) (hereinafter sometimes referred to simply as "monomer (A)"), a monomer (B) having a crosslinkable group (hereinafter sometimes referred to simply as "monomer (B)") and a monomer (C) having no fluorine atom and no crosslinkable group (hereinafter sometimes referred to simply as "monomer (C)").

In the present invention, the fluoro-olefin (A) is a monomer having a radical polymerizable double bond and at least one fluorine atom in its molecule. Specific examples of the fluoro-olefin may be chlorotrifluoroethylene, tetrafluoroethylene, hexafluoropropylene, vinylidene fluoride, vinyl fluoride, bromotrifluoroethylene, pentafluoropropylene, a perfluoroalkyl vinyl ether, etc. The number of carbon atoms in the perfluoroalkyl group in the perfluoroalkyl vinyl ether is preferably from 1 to 18.

These monomers may be used alone, or two or more of them may be used in combination.

Among them, as the fluoro-olefin (A), chlorotrifluoroethylene or tetrafluoroethylene is preferred, since the copolymerizability with the monomer (B) and the monomer (C) is good, and the weather resistance of the obtainable fluorinated copolymer is good.

In the present invention, the monomer (B) is not particularly limited so long as it is copolymerizable with the monomer (A) and the monomer (C), but is preferably an unsaturated compound having a crosslinkable group. For example, it is possible to use preferably an alkyl vinyl ether having a crosslinkable group, an alkyl allyl ether having a crosslinkable group, an alkanoic acid vinyl ester having a crosslinkable group, an alkanoic acid allyl ester having a crosslinkable group, a (meth)acrylic acid alkyl ester having a crosslinkable group, etc.

These monomers may be used alone, or two or more of them may be used in combination.

The crosslinkable group in the monomer (B) is not particularly limited so long as it is a group capable of forming a cross-linked structure by e.g. its reaction with a curing agent or by a reaction of crosslinkable groups each other. Specific examples of the crosslinkable group may be a hydroxy group, a carboxy group, an epoxy group, an oxetanyl group, an amino group, an alkoxysilyl group, etc.

Among them, as the crosslinkable group, a hydroxy group is preferred, since the weather resistance of the obtainable copolymer and the surface hardness after curing will be thereby good.

In a case where the crosslinkable group in the monomer (B) is a hydroxy group, a fluorinated copolymer having hydroxy groups will be obtained. The hydroxyl value in the obtained fluorinated copolymer is preferably from 10 to 200 mgKOH/g, more preferably from 25 to 200 mgKOH/g. When the hydroxyl value of the fluorinated copolymer is within the above range, the impact resistance of the coating film thereby obtainable will be good.

Specific examples of the monomer (B) will be shown below.

Specific examples of the monomer having a hydroxy group include hydroxyalkyl vinyl ethers such as 2-hydroxyethyl vinyl ether, 3-hydroxypropyl vinyl ether, 4-hydroxybutyl vinyl ether, 4-hydroxycyclohexyl vinyl ether, 4-(hydroxymethyl)cyclohexylmethyl vinyl ether, 2-hydroxypropyl vinyl ether, 2-hydroxy-2-methylpropyl vinyl ether, 4-hydroxy-2-methylbutyl vinyl ether, 5-hydroxypentyl vinyl ether, 6-hydroxyhexyl vinyl ether, etc.;

hydroxyalkyl allyl ethers such as 2-hydroxyethyl allyl ether, 3-hydroxypropyl allyl ether, 4-hydroxybutyl allyl ether, 4-hydroxycyclohexyl allyl ether, 2-hydroxybutyl allyl ether, glycerol monoallyl ether, etc.;

hydroxyalkyl carboxylic acid vinyl esters such as vinyl hydroxyacetate, vinyl lactate, vinyl hydroxyisobutyrate, vinyl hydroxypropionate, vinyl hydroxybutyrate, vinyl hydroxyvalerate, vinyl hydroxycyclohexylcarboxylate, hydroxyethyl vinyl ester, hydroxybutyl vinyl ester, etc.;

(meth)acrylic acid hydroxyesters such as 2-hydroxyethyl (meth)acrylate, etc.;

hydroxyalkylcarboxylic acid allyl esters such as hydroxypropionic acid allyl ester, hydroxybutylcarboxylic acid allyl ester, etc.; and ethylene glycol monovinyl ethers such as diethylene glycol monovinyl ether, triethylene glycol monovinyl ether, tetraethylene glycol monovinyl ether, etc.

Specific examples of the monomer having a carboxy group include unsaturated carboxylic acids such as 3-butenoic acid, 4-pentenoic acid, 2-hexenoic acid, 3-hexenoic acid, 5-hexenoic acid, 2-heptenoic acid, 3-heptenoic acid, 6-heptenoic acid, 3-octenoic acid, 7-octenoic acid, 2-nonenoic acid, 3-nonenoic acid, 8-nonenoic acid, 9-undecenoic acid or 10-undecenoic acid, acrylic acid, methacrylic acid, vinyl acetic acid, crotonic acid, cinnamic acid, etc.;

alkanoic acid vinyl ethers such as vinyloxy valeric acid, 3-vinyloxy propionic acid, 3-(2-vinyloxybutoxycarbonyl) propionic acid, 3-(2-vinyloxyethoxycarbonyl) propionic acid, etc.;

alkanoic acid allyl ethers such as allyloxy valeric acid, 3-allyloxy propionic acid, 3-(2-allyloxybutoxycarbonyl) propionic acid, 3-(2-allyloxyethoxycarbonyl) propionic acid, etc.;

saturated polybasic carboxylic acid monovinyl esters such as monovinyl adipate, monovinyl succinate, monovinyl phthalate, monovinyl pyromellitate, etc.;

unsaturated dicarboxylic acids such as itaconic acid, maleic acid, fumaric acid, etc.; and unsaturated dicarboxylic acid monoesters such as an itaconic acid monoalkyl ester, a maleic acid monoalkyl ester, a fumaric acid monoalkyl ester, etc.

Specific examples of the monomer having an epoxy group include glycidyl vinyl ether, glycidyl allyl ether, etc.

Specific examples of the monomer having an oxetanyl group include 3-ethyl-3-(vinyloxymethyl)oxetane, etc.

Specific examples of the monomer having an amino group include an aminoalkyl vinyl ether represented by $CH_2=CR^1—O—(CH_2)_x—NH_2$ ($R^1$ is a hydrogen atom or a methyl group, and x=0 to 10); an aminoalkyl allyl ether represented by $CH_2=CR^1—CH_2—O—(CH_2)_x—NH_2$ ($R^1$ is a hydrogen atom or a methyl group, and x=0 to 10); an aminoalkylcarboxylic acid vinyl ester represented by $CH_2=CH—O—CO(CH_2)_x—NH_2$ (x=1 to 10); other aminomethylstyrene, vinylamine, etc.

Specific examples of the monomer having an alkoxysilyl group include (meth)acrylic acid alkoxysilylalkyl esters such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, etc.;

vinyl silanes such as $CH_2=CHSi(OCH_3)_3$, $CH_2=CHSi(OC_2H_5)_3$, $CH_2=CHSiCH_2(OCH_3)_2$, $CH_2=CHSi(CH_3)_2(OC_2H_5)$, $CH_2=CHSi(CH_3)_2SiCH_3(OCH_3)_2$, or their partial hydrolysates, etc.; and alkoxysilylalkyl vinyl ethers such as trimethoxysilylethyl vinyl ether, triethoxysilylethyl vinyl ether, trimethoxysilylbutyl vinyl ether, methyldimethoxysilylethyl vinyl ether, trimethoxysilylpropyl vinyl ether, triethoxysilylpropyl vinyl ether, etc.

The above-described monomers (B) may be used alone, or two or more of them may be used in combination. Further, by using a plurality of monomers having different crosslinkable groups, the fluorinated copolymer may have plural types of crosslinkable groups.

Among them, a hydroxyalkyl vinyl ether such as 4-hydroxybutyl vinyl ether is preferred, since the copolymerizability and weather resistance of the obtainable copolymer will be good, and the surface hardness after curing the coating film will be high.

Further, after conducting the polymerization reaction, crosslinkable groups may be introduced into the fluorinated copolymer by a modification reaction such as conversion of functional groups.

In the present invention, the monomer (C) is not particularly limited so long as it is copolymerizable with the fluoro-olefin (A) and the monomer (B).

Specific examples of the monomer (C) include alkyl vinyl ethers, alkyl allyl ethers, alkanoic acid vinyl esters, alkanoic acid allyl esters, (meth)acrylic acid esters, etc.

Specific examples of the alkyl vinyl ethers include methyl vinyl ether, ethyl vinyl ether, n-butyl vinyl ether, isobutyl vinyl ether, tert-butyl vinyl ether, cyclohexyl vinyl ether, chloroethyl vinyl ether, 2-ethylhexyl vinyl ether, octadecanoyl vinyl ether, etc.

Specific examples of the alkyl allyl ethers include methyl allyl ether, ethyl allyl ether, n-butyl allyl ether, isobutyl allyl ether, etc.

Specific examples of the alkanoic acid vinyl esters include saturated fatty acid vinyl esters such as vinyl acetate, vinyl propionate, vinyl butyrate, vinyl isobutyrate, vinyl valerate, vinyl pivalate, vinyl hexanoate, vinyl octanoate, VeoVa 9 and VeoVa 10 (trade name, vinyl ester of branched fatty acid having 9 or 10 carbon atoms, manufactured by Shell Chemicals), vinyl versatate, etc.

Specific examples of the alkanoic acid allyl esters include allyl acetate, allyl propionate, allyl butyrate, allyl isobutyrate, allyl valerate, allyl pivalate, allyl hexanoate, allyl octanoate, etc.

Specific examples of the (meth)acrylic acid esters include methyl(meth)acrylate, ethyl(meth)acrylate, butyl (meth) acrylate, cyclohexyl(meth)acrylate, stearyl(meth)acrylate, behenyl(meth)acrylate, etc.

They may be used alone, or two or more of them may be used in combination.

Among them, an alkyl vinyl ether or an alkanoic acid vinyl ester is preferred, since the copolymerizability with the fluoro-olefin is good.

With respect to the molar ratios of the respective monomers in the monomer mixture, to the total molar amount of the monomer mixture, the fluoro-olefin (A) is preferably from 25 to 70 mol %, more preferably from 40 to 60 mol %, further preferably from 45 to 55 mol %. Further, to the total molar amount of the monomer mixture, the monomer (B) is preferably from 1 to 70 mol %, more preferably from 1 to 40 mol %, further preferably from 3 to 30 mol %. Further, to the total molar amount of the monomer mixture, the monomer (C) is preferably from 1 to 70 mol %, more preferably from 20 to 60 mol %, further preferably from 30 to 50 mol %. Here, the total content of (A)+(B)+(C) is preferably 100 mol %.

Within the above molar ratios, the solubility of the fluorinated copolymer in an organic solvent will be improved, and it becomes possible to better prevent gelation during the storage.

The composition of the fluorinated copolymer contained in the fluorinated copolymer solution is preferably the same as the above-mentioned molar ratios of the monomer mixture. Specifically, the constituent units based on the monomer (A) are preferably from 5 to 70 mol %, more preferably from 40 to 60 mol %, further preferably from 45 to 55 mol %, to the total constituent units contained in the fluorinated copolymer. Further, the constituent units based on the monomer (B) are preferably from 1 to 70 mol %, more preferably from 1 to 40 mol %, further preferably from 3 to 30 mol %, to the total constituent units contained in the fluorinated copolymer. Further, the constituent units based on the monomer (C) are preferably from 1 to 70 mol %, more preferably from 20 to 60 mol %, further preferably from 30 to 50 mol %, to the total constituent units contained in the fluorinated copolymer.

The weight average molecular weight (Mw) of the fluorinated copolymer is not particularly limited, but is preferably from 1,000 to 200,000, more preferably from 5,000 to 100,000.

In the present invention, the compound having a piperidyl group has a piperidyl group represented by the following formula (1).

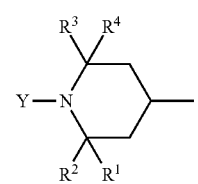

(1)

In the formula (1), each of $R^1$, $R^2$, $R^3$ and $R^4$ which are independent of one another, is a hydrogen atom, a methyl group or a hydroxy group, and Y is a hydrogen atom, an oxy radical group, an alkyl group, an alkoxy group, an aryl group or a hydroxy group.

In the formula (1), when Y is an alkyl group, the number of carbon atoms is preferably from 1 to 12; when Y is an alkoxy group, the number of carbon atoms is preferably from 1 to 12; and when Y is an aryl group, the number of carbon atoms is preferably from 6 to 12. Further, the alkyl group or the alkoxy group represented by Y independently is linear or cyclic and may have a branched chain. Further, the alkyl group, the alkoxy group or the aryl group represented by Y may independently have a substituent, and the substituent may, for example, be a hydroxy group, a benzoyloxy group or an acetoxy group.

Among piperidyl groups represented by the formula (1), a compound having a piperidyl group wherein all of $R^1$, $R^2$, $R^3$ and $R^4$ are methyl groups, is preferred from the viewpoint of the price and availability. Further, a compound having a piperidyl group wherein Y is a methyl group or a hydrogen atom, is preferred from such a viewpoint that the storage stability of the obtainable fluorinated copolymer solution will be good.

An atom or group, to which the bond at the 4-position of the piperidyl group represented by the formula (1) is bonded, may, for example, be a hydrogen atom, a hydroxy group, an alkyl group, an alkoxy group, an aryl group, a benzoyloxy group or an acetoxy group.

The compound having such a piperidyl group may, for example, be 2,2,6,6-tetramethylpiperidine, 1,2,2,6,6-pentamethylpiperidine, 2,2,6,6-tetramethyl-4-hydroxypiperidine, 1,2,2,6,6-pentamethyl-4-hydroxypiperidine, 1-ethyl-2,2,6,6-tetramethylpiperidine, 1-ethyl-2,2,6,6-tetramethyl-4-hydroxypiperidine, 1-butyl-2,2,6,6-tetramethyl-4-hydroxypiperidine, 1-dodecyl-2,2,6,6-tetramethylpiperidine, 1-phenyl-2,2,6,6-tetramethylpiperidine, 1-(2-hydroxyethyl)-2,2,6,6-tetramethylpiperidine, 1-(6-hydroxyethyl)-4-hydroxy-2,2,6,6-tetramethylpiperidine, 4-acetoxy-2,2,6,6-tetramethylpiperidine, 4-acetoxy-1,2,2,6,6-pentamethylpiperidine, 1-(2-acetoxyethyl)-4-acetoxy-2,2,6,6-tetramethylpiperidine, 1-(2-benzoyloxyethyl)-4-benzoyloxy-2,2,6,6-tetramethylpiperidine, 4-ethyl-2,2,6,6-tetramethylpiperidine, 4-ethyl-1,2,2,6,6-pentamethylpiperidine, 4-butyl-2,2,6,6-tetramethylpiperidine, 4-octyl-2,2,6,6-tetramethylpiperidine, 4-dodecyl-2,2,6,6-tetramethylpiperidine, 4-stearyl-2,2,6,6-tetramethylpiperidine or 4-stearyl-1,2,2,6,6-pentamethylpiperidine.

Further, the compound having a piperidyl group represented by the formula (1) may be a compound having two or more piperidyl groups in one molecule. In such a case, as described below, preferred is a compound having two or more piperidyl groups bonded via the bond at the 4-position of the piperidyl group represented by the formula (1).

Such a compound having two or more piperidyl groups in one molecule may be obtained, for example, by reacting a 2,2,6,6-tetramethylpiperidine having a hydroxy group, such as 4-hydroxy-2,2,6,6-tetramethylpiperidine or 4-hydroxy-1,2,2,6,6-pentamethylpiperidine, with a compound having two or more functional groups in one molecule, such as succinic acid, adipic acid, sebacic acid, azelaic acid, decane-1,10-dicarboxylic acid, phthalic acid, isophthalic acid, terephthalic acid, trimellitic acid, malonic acid or a substituted malonic acid.

A compound containing two or more 2,2,6,6-tetramethylpiperidyl groups in one molecule, may, for example, be bis(1,2,2,6,6-pentamethyl-4-piperidyl) sebacate (the following formula (2), trade name "TINUVIN765", manufactured by BASF), bis(1,2,2,6,6-pentamethyl-4-piperidyl)[[3,5-bis(1,1-dimethylethyl)-4-hydroxyphenyl]methyl]butyl malonate (the following formula (3), trade name "TINUVIN144, manufactured by BASF), bis(2,2,6,6-tetramethyl-4-piperidyl) sebacate (the following formula (4), trade name "TINUVIN770DF", manufactured by BASF), bis(1-octyloxy-2,2,6,6-tetramethyl-4-piperidyl) sebacate (the following formula (7), trade name "TINUVIN123", manufactured by BASF), 2,4-bis[N-butyl-N-(1-cyclohexyloxy-2,2,6,6-tetramethyl-piperidin-4-yl)amino]-6-(2-hydroxyethyleneamine)-1,3,5-triazine (the following formula (8), trade name "TINUVIN152", manufactured by BASF), or N,N'-bisformyl-N,N'-bis(2,2,6,6-tetramethyl-4-piperidyl) hexamethylenediamine (the following formula (9), trade name "Uvinul4050H", manufactured by BASF).

It is preferred to use such a compound having two or more 2,2,6,6-tetramethylpiperidyl groups in one molecule, since it is thereby possible to carry out the polymerization stably, and the storage stability of the obtainable fluorinated copolymer solution will be good.

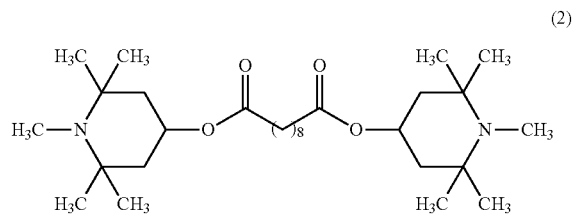

(2)

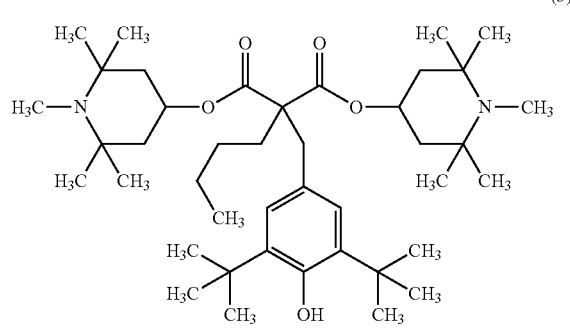

(3)

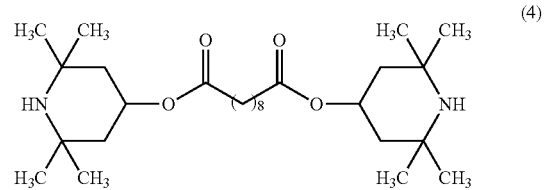

(4)

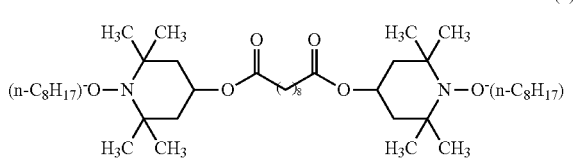

(7)

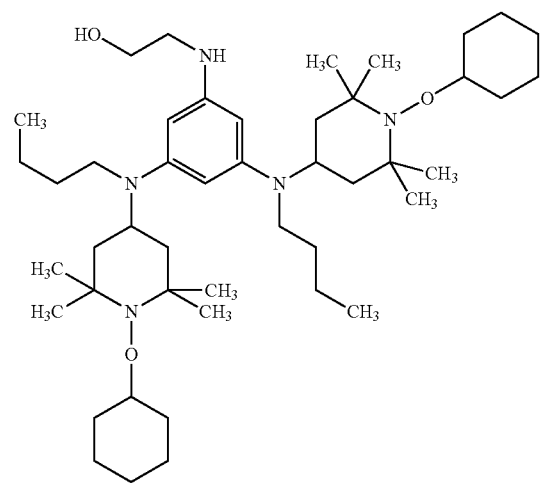

(8)

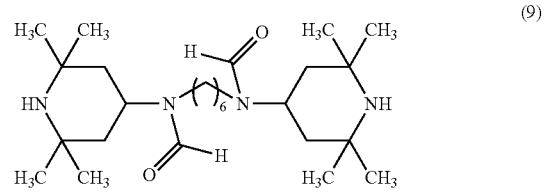

(9)

Further, the compound having a piperidyl group may be a polymer having constituent units having piperidyl groups represented by the above formula (1). Such a polymer may be one having piperidyl groups bonded to its main chain or side chains. Further, it may be a polymer having constituent units represented by the following formula (10) in its main chain. The number average molecular weight of such a polymer is preferably from 1,000 to 4,000.

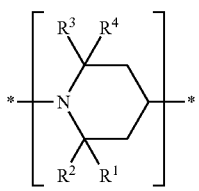

(10)

The polymer having constituent units represented by the formula (10) may, for example, be a polymer represented by the following formula (11) i.e. a polymer of succinic acid with 4-hydroxy-2,2,6,6-tetramethyl-1-hydroxyethylpiperidine (trade name "TINUVIN622", manufactured by BASF). In the following formula (11), n is preferably an integer of from 5 to 15.

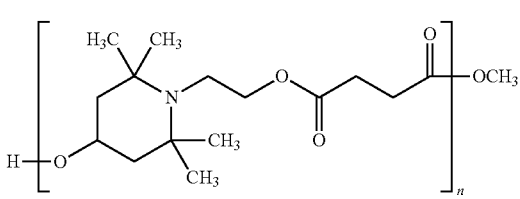

(11)

These compounds having piperidyl groups may be used alone, or two or more of them may be used in combination.

In the present invention, the total molar amount of piperidyl groups contained in the compound having a piperidyl group, contained in the polymerization system at the time of polymerization for the fluorinated copolymer, is adjusted to be within a specific range to the total molar amount of the monomer mixture.

The molar ratio of the total molar amount of piperidyl groups contained in the compound having a piperidyl group to the total molar amount of the monomer mixture is from 0.00105 to 0.00380. This molar ratio is preferably at least 0.00110, more preferably at least 0.00115. Further, this molar ratio is preferably at most 0.00370, more preferably at most 0.00360.

If the molar ratio of piperidyl groups contained in the compound having a piperidyl group is less than the lower limit value, gelation of the fluorinated copolymer is likely to proceed during the polymerization or after the polymerization, or the storage stability is likely to deteriorate. This is considered to be such that excessive radicals not contributing to the reaction react with piperidyl groups, whereby the acid accepting effect of piperidyl groups is lost.

When the molar ratio of piperidyl groups contained in the compound having a piperidyl group is at most the upper limit value, the storage stability of the fluorinated copolymer solution will be good, and the dryability of a coating film of the coating composition employing the fluorinated copolymer will be good.

Here, the total molar amount of the monomer mixture is the total of the molar amounts of the fluoro-olefin (A), the monomer (B) having a crosslinkable group and the monomer (C) having no fluorine atom and no crosslinkable group, constituting the monomer mixture, to be used for the polymerization.

Further, the total molar amount of piperidyl groups contained in the compound having a piperidyl group is the same as the molar amount of the compound having a piperidyl group in a case where one piperidyl group is contained in the compound having a piperidyl group to be used for the polymerization, and it is a molar amount obtained by multiplying the molar amount of the compound by the number of piperidyl groups contained in the compound in a case where two or more piperidyl groups are contained in the compound having a piperidyl group to be used for the polymerization.

The fluorinated copolymer in the present invention can be produced as polymerized by using a conventional method. For example, stabilized polymerization can be carried out by conducting solution polymerization in such a state that the monomer mixture comprising the monomers (A), (B) and (C) is dissolved in the presence of an organic solvent. Further, as the case requires, a radical polymerization initiator, a chain transfer agent, etc., may be added to carry out the polymerization reaction.

The organic solvent is not particularly limited and may, for example, be xylene, ethanol, tert-butyl alcohol, acetone, methyl ethyl ketone, methyl isobutyl ketone, ethoxyethyl propionate, cyclohexanone, tert-butyl acetate, chlorobenzene trifluoride, mineral spirits (light oil obtainable by decomposition or hydrogenation purification of oil fraction or residual oil), cyclohexane, ethyl acetate, butyl acetate, HCFC-141b, HCFC-225, etc. These solvents may be used alone, or two or more of them may be used in combination.

Among them, xylene is preferred, since the solubility of the formed polymer is good, and stabilized polymerization is thereby carried out.

With respect to the amount of the organic solvent to be used for the polymerization reaction, it is preferred to adjust the amount of the organic solvent so that the molar ratio of the total molar amount of the monomer mixture to the total molar amount of the organic solvent would be from 0.5 to 5, more preferably from 0.5 to 2. It is thereby possible to increase the reaction rate for polymerization and to adjust the molecular weight of the obtainable polymer.

In the polymerization reaction, it is preferred to use a radical polymerization initiator. As the radical polymerization initiator, a common radical polymerization initiator may be used. For example, an organic peroxide such as a peroxy ester, a diacyl peroxide, a peroxy dicarbonate or a dialkyl peroxide, or an azo compound such as AIBN, may be mentioned.

As the radical polymerization initiator, a peroxy ester compound being a compound represented by the following formula (5) is preferred, since the reactivity for polymerization is thereby good, and it is thereby possible to reduce coloration during the storage of the obtainable fluorinated copolymer solution.

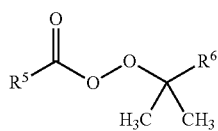

(5)

In the formula (5), each of $R^5$ and $R^6$ which are independent of each other, is a $C_{1-12}$ alkyl group or a $C_{6-12}$ aryl group.

$R^5$ in the compound represented by the formula (5) is preferably a group represented by the following formula (6). By using such a peroxy ester compound, it is possible to further reduce coloration during the storage of the obtainable fluorinated copolymer solution.

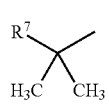

(6)

In the formula (6), $R^7$ is a $C_{1-9}$ alkyl group.

Specific examples of the peroxy ester compound having such a structure include 1,1,3,3-tetramethylbutylperoxy neodecanoate, 1,1,3,3-tetramethylbutylperoxy pivalate, 1,1-dimethylbutylperoxy neodecanoate, 1,1-dimethylpropylperoxy neodecanoate, tert-butylperoxy neodecanoate, tert-butylperoxy neoheptanoate, 1,1-dimethylbutylperoxy pivalate, 1,1-dimethylpropylperoxy pivalate, tert-butylperoxy pivalate, cumylperoxy neodecanoate, cumylperoxy neoheptanoate, etc. They may be used alone, or two or more of them may be used in combination.

It is particularly preferred to employ 1,1,3,3-tetramethylbutylperoxy neodecanoate, 1,1,3,3-tetramethylbutylperoxy pivalate, 1,1-dimethylbutylperoxy neodecanoate, 1,1-dimethylpropylperoxy neodecanoate, tert-butylperoxy neodecanoate, tert-butylperoxy neoheptanoate, 1,1-dimethylbutylperoxy pivalate, 1,1-dimethylpropylperoxy pivalate or tert-butylperoxy pivalate.

By using them, it is possible to let the polymerization reaction proceed more smoothly and to improve the conversion of the monomers. Further, it is possible to further improve the storage stability of the obtainable fluorinated copolymer solution. Furthermore, it is possible to reduce coloration of the fluorinated copolymer solution obtainable by the polymerization.

The amount of the radical polymerization initiator to be used, is preferably from 0.00001 to 0.1, more preferably from 0.001 to 0.05, by molar ratio to the total molar amount of the monomer mixture. It is thereby possible to let the polymerization reaction proceed more smoothly and to increase the reactivity of the monomers.

In order to adjust the polymerization degree (molecular weight) of the fluorinated copolymer, a chain transfer agent may be used in the polymerization reaction. As the chain transfer agent, it is possible to use, for example, an alkyl mercaptan such as tert-dodecyl mercaptan, n-dodecyl mercaptan or stearyl mercaptan, aminoethanethiol, mercaptoethanol, 3-mercaptopropionic acid, 2-mercaptopropionic acid, thiomalic acid, thioglycolic acid, 3,3'-dithio-dipropionic acid, 2-ethylhexyl thioglycolate, n-butyl thioglycolate, methoxybutyl thioglycolate, ethyl thioglycolate, 2,4-diphenyl-4-methyl-1-pentene, or carbon tetrachloride. The amount of the chain transfer agent to be used, is preferably from 0.00001 to 0.1 by molar ratio to the total molar amount of the monomer mixture.

In the polymerization reaction, the respective components such as the monomer mixture, the compound having a piperidyl group, the organic solvent, the optional radical polymerization agent or chain transfer agent, etc., may be charged preliminarily all at once to initiate the polymerization, or the respective components may be dividedly or continuously added to the reaction container to carry out the polymerization sequentially.

The polymerization temperature may be suitably selected depending upon the types of the radical polymerization initiator and the solvent, and the molecular weight of the desired fluorinated copolymer. For example, from 0 to 150° C. is preferred, and from 20 to 80° C. is more preferred. The reaction temperature may not necessarily be constant during the polymerization and may be raised or lowered as the case requires.

The polymerization pressure may be suitably selected depending upon the type and charged amount of the fluoroolefin (A), the polymerization temperature, etc. For example, as a gauge pressure, at most 3.5 MPa is preferred, and at most 2.0 MPa is more preferred.

The polymerization time may be suitably selected depending upon the 10 hours half-life temperature of the radical polymerization initiator to be used, the molecular weight of the desired fluorinated copolymer and the timing for subsequent addition of the radical polymerization initiator or monomers. For example, it is adjustable within a range of from 1 to 72 hours.

Here, the 10 hours half-life temperature of the radical polymerization initiator is the temperature at which the organic peroxide concentration becomes to be a half after 10 hours at a concentration of 0.1 mol/L in benzene and is one of indices representing the thermal properties of the organic peroxide.

Further, in order to let the polymerization reaction proceed smoothly, it is preferred to stir the reaction system. The stirring may suitably be selected depending upon the size of the reaction container, the shape of stirring blades and the power of the motor to be used, and, for example, it is adjustable within a range of from 15 to 500 rpm.

[Fluorinated Copolymer Solution]

The fluorinated copolymer solution in the present invention is one produced by the above-described method for producing a fluorinated copolymer solution and is preferably a solution comprising the fluorinated copolymer, the compound having a piperidyl group, the organic solvent, etc. The fluorinated copolymer solution may be the solution obtained by the polymerization, as it is, or one having the concentration of the fluorinated copolymer adjusted by dilution or concentration. In the case of diluting the fluorinated copolymer solution obtained by the polymerization, the organic solvent to be used is not particularly limited, but it is preferred to conduct the dilution with the same solvent as used in the polymerization. Whereas, solvent substitution by another solvent may be made as the case requires.

The solid content concentration in the obtainable fluorinated copolymer solution is preferably from 30 to 80 mass %, more preferably from 40 to 70 mass %.

[Coating Composition]

The coating composition in the present invention is characterized by containing the above-described fluorinated copolymer solution. As the coating composition, the above fluorinated copolymer solution may be used as it is. Otherwise, the coating composition may further contain additives for coating materials, such as a pigment, a curing agent, etc.

As the pigment, pigments which are commonly added to usual coating materials, may be employed. Particularly, coloring pigments may be employed in order to make coating materials having various colors including white. As the coloring pigments, it is preferred to employ pigments having good weather resistance. As such pigments, a crystalline system pigment of an oxide of metal such as magnesium, aluminum, iron, cobalt, bismuth, chromium or titanium, an organic pigment such as perylene, diketopyrrolo-pyrrole, quinacridone, benzimidazolone, indanthrene blue, dioxane violet or azo, surface-treated titanium oxide, carbon black, etc. may be mentioned. Further, in order to impart a metallic luster to the coating film, a pearl pigment, aluminum flakes, glass flakes, etc. may also be employed.

The content of such a pigment is preferably from 1 to 70 mass %, more preferably from 10 to 60 mass %, to the entire coating composition.

The curing agent is preferably suitably selected depending upon the crosslinkable groups in constituent units based on the monomer (B) in the fluorinated copolymer.

In a case where the crosslinkable groups are hydroxy groups, the curing agent is preferably a polyisocyanate. The polyisocyanate may, for example, be IPDI (isophorone diisocyanate), HMDI (hexamethylene diisocyanate), HDI (hexane diisocyanate) or their modified products. The modified products may, for example, be ones having isocyanate groups blocked with epsilon caprolactam (E-CAP), methyl ethyl ketone oxime (MEK-OX), methyl isobutyl ketone oxime (MIBK-OX), pyrrolidine or triazine (TA), or ones having polyisocyanate groups coupled each other to form a uretdione bond.

Further, as other curing agents, melamine, etc. may also be used.

In a case where the crosslinkable groups are carboxy groups, phenolic hydroxy groups, etc., it is preferred to use, as the curing agent, a curing agent containing a glycidyl group, or an oxazoline type curing agent. As such a curing agent, an epoxy resin such as triglycidyl isocyanurate (TGIC), TM239 (manufactured by Nissan Chemical Industries, Ltd.) having a methylene group introduced to a glycidyl group portion of TGIC, or PT-910 (manufactured by Ciba) being a mixture of trimellitic acid glycidyl ester and terephthalic acid glycidyl ester, may be used. Further, as a curing agent for a condensation reaction, a β-hydroxyalkylamide type curing agent may be used. As such a curing agent, Primid XL-552 (manufactured by EMS) may be mentioned.

In a case where the crosslinkable groups are glycidyl groups, a dibasic acid type curing agent, an amine type curing agent, etc. may preferably be used. Specific examples include dodecanedioic acid, cyclic amidine, polyamine, polyhydrazide, a polymer having an acid introduced, etc.

With respect to the proportion of the curing agent to be used, in the case of a curing agent other than an amine type curing agent, usually to the number of moles of the crosslinkable groups in the fluorinated copolymer, the molar ratio of functional groups in the curing agent is preferably from 0.7 to 1.3, more preferably from 0.8 to 1.2, further preferably from 0.9 to 1.2. In the case where the curing agent is a cyclic amidine, the molar ratio is preferably from 0.1 to 0.7, more preferably from 0.2 to 0.6, further preferably from 0.3 to 0.5.

Other additives which are commonly used for coating materials, may suitably be used for the coating composition in the present invention. Specific example of such other additives include an antioxidant, an anti-sagging agent, an ultraviolet absorber, a photostabilizer, a pigment dispersant, a surface-adjusting agent, a slipping agent, a catalyst, a hydrophilizing agent, a water repellent, an oil repellent, etc.

Further, in the coating composition, within a range not to impair the effects of the present invention, other resins such as a polyester resin, an acrylic resin, an epoxy resin, a silicone resin, etc. may be used in combination.

As the method for producing the coating composition, a conventional method may be employed. For example, the above fluorinated copolymer solution may be used as it is, or the above additives may be added to the fluorinated copolymer solution, followed by mixing and dispersing in a stirrer such as Disper to produce the coating composition.

In a case where the coating composition contains a curing agent, the timing for its addition may be varied depending upon the formulation of the coating material. For example, in the case of one pack type coating material such as a bake coating material, it is preferred to add the curing agent after the production of the polymer. In the case of a two pack type coating composition where the curing agent and other component are separated, it is preferred to mix the curing agent with other component immediately before coating.

The method for applying the coating composition is not particularly limited, and it is possible to obtain a coating film by applying the coating composition in a thickness of from a few to a few tens micrometers by means of a coating device such as a brush, a roller, a dipping device, a spray, a roll coater, a die coater, an applicator or a spin coater, followed by drying for a predetermined time at a temperature of from room temperature to about 300° C. As objects to be coated, bridges, tanks, building members, mobile objects, other metal or non-metal members, etc. may be mentioned.

EXAMPLES

Now, the present invention will be described in detail with reference to Examples, but it should be understood that the present invention is by no means limited to these Examples. In the following description, a component proportion of "mass %" is represented simply by "%" unless otherwise specified.

Example 1

Into a stainless steel pressure resistant reactor having an internal capacity of 2,500 ml and equipped with a stirrer, 12.43 g of bis(1,2,2,6,6-pentamethyl-4-piperidyl)[[3,5-bis(1,1-dimethylethyl)-4-hydroxyphenyl]methyl]butyl malonate, 929 g of xylene, 212 g of ethyl vinyl ether (EVE), 132 g of 4-hydroxybutyl vinyl ether (HBVE) and 214 g of cyclohexyl vinyl ether (CHVE) were charged, and dissolved oxygen in the solution was removed by deaeration with nitrogen. To this reactor, 677 g of chlorotrifluoroethylene (CTFE) was introduced, followed by gradual heating, and when the temperature reached 65° C., 12.14 g of t-butyl peroxypivalate (PBPV) as a radical polymerization initiator was intermittently added to promote the polymerization.

10 hours later, the reactor was cooled with water to terminate the reaction. The reaction solution was cooled to room temperature; unreacted monomers were purged; and the concentration of the obtained reaction solution was adjusted to obtain a fluorinated copolymer solution A1 containing a fluorinated copolymer 1 at a solid content concentration of 60.7%.

Example 2

Into a stainless steel pressure resistant reactor having an internal capacity of 2,500 ml and equipped with a stirrer, 7.70 g of bis(1,2,2,6,6-pentamethyl-4-piperidyl)[[3,5-bis(1,1-dimethylethyl)-4-hydroxyphenyl]methyl]butyl malonate, 755 g of xylene, 160 g of ethyl vinyl ether (EVE), 100 g of 4-hydroxybutyl vinyl ether (HBVE) and 161 g of cyclohexyl vinyl ether (CHVE) were charged, and dissolved oxygen in the solution was removed by deaeration with nitrogen. To this reactor, 512 g of chlorotrifluoroethylene (CTFE) was introduced, followed by gradual heating, and when the temperature reached 65° C., 2.70 g of 1,1,3,3-tetramethyl-butylperoxy neodecanoate (POND) as a radical polymerization initiator was intermittently added to promote the polymerization.

10 hours later, the reactor was cooled with water to terminate the reaction. The reaction solution was cooled to room temperature; unreacted monomers were purged; and the concentration of the obtained reaction solution was adjusted to obtain a fluorinated copolymer solution A2 containing a fluorinated copolymer 2 at a solid content concentration of 60.3%.

Example 3

A fluorinated copolymer solution A3 containing a fluorinated copolymer 3 at a solid content concentration of 61.0% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 4.63 g, xylene was changed to 1,002 g, and t-butyl peroxypivalate (PBPV) as a radical polymerization initiator was changed to 3.19 g.

Example 4

A fluorinated copolymer solution A4 containing a fluorinated copolymer 4 at a solid content concentration of 60.3% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 14.24 g.

Example 5

A fluorinated copolymer solution A5 containing a fluorinated copolymer 5 at a solid content concentration of 60.2% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 9.28 g of bis(1,2,2,6,6-pentamethyl-4-piperidyl) sebacate.

Example 6

A fluorinated copolymer solution A6 containing a fluorinated copolymer 6 at a solid content concentration of 60.4% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 6.19 g of bis(2,2,6,6-tetramethyl-4-piperidyl) sebacate, and xylene was changed to 842 g.

Comparative Example 1

A fluorinated copolymer solution A7 containing a fluorinated copolymer 7 at a solid content concentration of 60.4% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 3.98 g, xylene was changed to 1,002 g, and t-butyl peroxypivalate (PBPV) as a radical polymerization initiator was changed to 2.94 g.

Comparative Example 2

A fluorinated copolymer solution A8 containing a fluorinated copolymer 8 at a solid content concentration of 60.4% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 15.34 g.

Comparative Example 3

A fluorinated copolymer solution A9 containing a fluorinated copolymer 9 at a solid content concentration of 60.4% was obtained by carrying out polymerization in the same manner as in Example 1 except that bis(1,2,2,6,6-pentamethyl-4-piperidyl)[[3,5-bis(1,1-dimethylethyl)-4-hydroxyphenyl]methyl]butyl malonate was changed to 18.54 g.

The components used in the respective Examples and Comparative Examples are as follows.

Bis(1,2,2,6,6-pentamethyl-4-piperidyl)[[3,5-bis(1,1-dimethylethyl)-4-hydroxyphenyl]methyl]butyl malonate: the compound having a piperidyl group represented by the formula (3), "TINUVIN144" manufactured by BASF Bis(1,2,2,6,6-pentamethyl-4-piperidyl) sebacate: the compound having a piperidyl group represented by the formula (2), "TINUVIN765" manufactured by BASF Bis(2,2,6,6-tetramethyl-4-piperidyl) sebacate: the compound having a piperidyl group represented by the formula (4), "TINUVIN770DF" manufactured by BASF t-Butyl peroxypivalate (PBPV): "Perbutyl PV" manufactured by NOF Corporation 1,1,3,3-tetramethylbutylperoxy neodecanoate (POND): "Perocta ND" manufactured by NOF Corporation The solid content concentration in each of the above fluorinated copolymer solutions was obtained by measuring the heating residue in accordance with JIS K5601-1-2 (2009).

<Physical Property Values and Storage Stability of Copolymers>

The physical property values and storage stability of the fluorinated copolymer solutions A1 to A9 are shown in the following Table 1. They were obtained as follows.

(Weight Average Molecular Weight Mw after Completion of Polymerization)

The weight average molecular weight Mw of each fluorinated copolymer after completion of polymerization was obtained by Size Exclusion Chromatography (which may be abbreviated as SEC). As the developing solvent, tetrahydrofuran (THF) was used, and as the standard substance for calculation of the molecular weight, a polystyrene standard having a preliminarily known molecular weight was used.

(70° C. Storage Stability)

100 g of a fluorinated copolymer solution was put in a heat resistant container and left to stand in a constant temperature tank at 70° C. under a relative humidity RH of 50%, and upon expiration of 14 days, the weight average molecular weight Mw was measured by Size Exclusion Chromatography (SEC). As the developing solvent, tetrahydrofuran (THF) was used, and as the standard substance for calculation of the molecular weight, a polystyrene standard having a preliminarily known molecular weight was used. The weight average molecular weight Mw after the above polymerization was used as the initial weight average molecular weight Mw. The ratio of Mw after 14 days at 70° C. to the initial Mw was obtained and is shown as the rate of increase in Mw after 14 days at 70° C.

Further, from the rate of increase in Mw after 14 days at 70° C., the 70° C. storage stability was evaluated by the following standards.

[A]: The rate of increase in Mw after 14 days at 70° C. was less than 150%, and the 70° C. storage stability was good.

[B]: The rate of increase in Mw after 14 days at 70° C. was at least 150%, and the 70° C. storage stability was not sufficiently obtained.

<Production of Coating Composition>

Example 7

58.04 g of the fluorinated copolymer solution A1 obtained in Example 1, 4.82 g of HDI nurate type polyisocyanate resin (trade name "Coronate HX", manufactured by Nippon Polyurethane Industry Co., Ltd.), 34.69 g of xylene and dibutyltin dilaurate (diluted 10,000 times with xylene to 2.45 g) as a curing catalyst were added and mixed to obtain a coating composition (1).

TABLE 1

Formulation and evaluation results of fluorinated copolymer solutions in Examples and Comparative Examples

|  | Ex. 1 | Ex. 2 | Ex. 3 | Ex. 4 | Ex. 5 |
|---|---|---|---|---|---|
| Fluorinated copolymer solution | A1 | A2 | A3 | A4 | A5 |
| Monomer (A) CTFE amount (mol) | 5.82 | 4.40 | 5.82 | 5.82 | 5.82 |
| Monomer (B) HBVE amount (mol) | 1.14 | 0.86 | 1.14 | 1.14 | 1.14 |
| Monomer (C) EVE amount (mol) | 2.94 | 2.22 | 2.94 | 2.94 | 2.94 |
| Monomer (C) CHVE amount (mol) | 1.70 | 1.28 | 1.70 | 1.70 | 1.70 |
| Monomers (A) + (B) + (C) Total molar amount (mol) | 11.59 | 8.75 | 11.59 | 11.59 | 11.59 |
| Compound having piperidyl group | Formula (3) | Formula (3) | Formula (3) | Formula (3) | Formula (2) |
| Compound having piperidyl group (mol) | 0.0182 | 0.0112 | 0.0068 | 0.0208 | 0.0182 |
| Total molar amount of piperidyl groups (mol) | 0.0364 | 0.0225 | 0.0135 | 0.0416 | 0.0365 |
| Total molar amount of piperidyl groups/total molar amount of monomers (molar ratio) | 0.00313 | 0.00257 | 0.00116 | 0.00359 | 0.00314 |
| Radical polymerization initiator | PBPV | POND | PBPV | PBPV | PBPV |
| Mw after completion | 44,800 | 41,600 | 43,100 | 43,900 | 45,800 |
| Mw after 14 days at 70° C. | 49,800 | 49,300 | 48,700 | 49,200 | 68,100 |
| Rate of increase in Mw after 14 days at 70° C. | 111 | 119 | 113 | 112 | 149 |
| 70° C. storage stability | A | A | A | A | A |

|  | Ex. 6 | Comp. Ex. 1 | Comp. Ex. 2 | Comp. Ex. 3 |
|---|---|---|---|---|
| Fluorinated copolymer solution | A6 | A7 | A8 | A9 |
| Monomer (A) CTFE amount (mol) | 5.82 | 5.82 | 5.82 | 5.82 |
| Monomer (B) HBVE amount (mol) | 1.14 | 1.14 | 1.14 | 1.14 |
| Monomer (C) EVE amount (mol) | 2.94 | 2.94 | 2.94 | 2.94 |
| Monomer (C) CHVE amount (mol) | 1.70 | 1.70 | 1.70 | 1.70 |
| Monomers (A) + (B) + (C) Total molar amount (mol) | 11.59 | 11.59 | 11.59 | 11.59 |
| Compound having piperidyl group | Formula (4) | Formula (3) | Formula (3) | Formula (3) |
| Compound having piperidyl group (mol) | 0.0129 | 0.0058 | 0.0224 | 0.0271 |
| Total molar amount of piperidyl groups (mol) | 0.0258 | 0.0116 | 0.0448 | 0.0542 |
| Total molar amount of piperidyl groups/total molar amount of monomers (molar ratio) | 0.00222 | 0.00100 | 0.00386 | 0.00467 |
| Radical polymerization initiator | PBPV | PBPV | PBPV | PBPV |
| Mw after completion | 53,600 | 43,600 | 44,600 | 43,800 |
| Mw after 14 days at 70° C. | 56,600 | 220,100 | 50,100 | 47,400 |
| Rate of increase in Mw after 14 days at 70° C. | 106 | 505 | 112 | 108 |
| 70° C. storage stability | A | B | A | A |

As shown in Table 1, in the fluorinated copolymer solution in each of Examples, the ratio of the total molar amount of piperidyl groups contained in the compound having a piperidyl group to the total molar amount of the monomer mixture to be used, was at least the predetermined level, whereby the storage stability was good. This is attributable to the fact that the increase in Mw during the high temperature storage was prevented, so that it was possible to prevent gelation.

Example 8

A coating composition (2) was obtained by the same method as in Example 7 except that the fluorinated copolymer solution A1 obtained in Example 1 was changed to the fluorinated copolymer solution A4 obtained in Example 4.

Comparative Example 4

A coating composition (3) was obtained by the same method as in Example 7 except that the fluorinated copolymer solution A1 obtained in Example 1 was changed to the fluorinated copolymer solution A8 obtained in Comparative Example 2.

Comparative Example 5

A coating composition (4) was obtained by the same method as in Example 7 except that the fluorinated copolymer solution A1 obtained in Example 1 was changed to the fluorinated copolymer solution A9 obtained in Comparative Example 3.

Example 9

To 16.58 g of the fluorinated copolymer solution A1 obtained in Example 1, 40.00 g of titanium oxide (trade name "D-918", manufactured by Sakai Chemical Industry Co., Ltd.) and 43.42 g of butyl acetate were added, and further 100 g of glass beads having a diameter of 1 mm were added, followed by stirring for two hours in a paint shaker. After the stirring, filtration was conducted to remove the glass beads to obtain a pigment composition.

To 38.2 g of this pigment composition, 51.71 g of the fluorinated copolymer solution A1, 21.1 g of HDI nurate type polyisocyanate (trade name "Coronate HX", manufactured by Nippon Polyurethane Industry Co., Ltd.), 7.64 g of butyl acetate, and dibutyltin dilaurate (diluted 10,000 times with xylene to 2.45 g) as a curing catalyst were further added and mixed to obtain a coating composition (5).

Example 10

A coating composition (6) was obtained by the same method as in Example 9 except that the fluorinated copolymer solution A1 obtained in Example 1 was changed to the fluorinated copolymer solution A4 obtained in Example 4.

Comparative Example 6

A coating composition (7) was obtained by the same method as in Example 9 except that the fluorinated copolymer solution A1 obtained in Example 1 was changed to the fluorinated copolymer solution A8 obtained in Comparative Example 2.

Comparative Example 7

A coating composition (8) was obtained by the same method as in Example 9 except that the fluorinated copolymer solution A1 obtained in Example 1 was changed to the fluorinated copolymer solution A9 obtained in Comparative Example 3.

<Evaluation of Coating Films Formed by Coating Compositions>

(Cure Degree (%) of Coating Film)

With respect to each of the above coating compositions (1) to (4), the cure degree of the coating film was evaluated. On the surface of a glass sheet, the coating composition was applied so that its film thickness would be 50 μm and aged for 7 hours in a constant temperature chamber. Thereafter, the coating film was peeled from the surface of the glass sheet, and by a soxhlet extraction method as described below, the cure degree of the coating film was calculated.

That is, the obtained coating film was accurately weighed (W0), and it was put in a cylindrical filter paper and set in an extraction tube of a soxhlet extraction device, whereupon extraction was conducted in 100 ml of acetone for one hour under reflux. After the extraction, the film remained in the cylindrical filter paper was dried at 50° C. for 24 hours, and its mass (W1) was accurately weighed. And, the cure degree (%) was calculated by the following formula and evaluated in accordance with the following standards.

Cure degree(%)=($W1-W0$)×100

"A": The cure degree was at least 70%.
"B": The cure degree was at least 50% and less than 70%.
"C": The cure degree was less than 50%.

(Surface Dryability of Coating Film)

With respect to each of the above coating compositions (5) to (8), the surface dryability was evaluated. On the surface of a chromate-treated aluminum sheet, the coating composition was applied so that its film thickness would be 50 μm and aged for 7 hours in a constant temperature chamber to form a coating film thereby to obtain a sample sheet.

With respect to each sample sheet, evaluation of the surface dryability of the coating film was carried out.

The evaluation was carried out by a method in accordance with JIS K5600-3-2 (1999). That is, Ballotini was lightly slapped by a brush, whereupon whether or not Ballotini was removed without imparting scratch marks on the surface of the coating film, was evaluated in accordance with the following standards. Here, Ballotini is glass beads classified to have a particle size of from 125 to 250 μm.

"A": Ballotini was completely removed without imparting scratch marks on the coating film.
"B": Ballotini was completely removed although scratch marks were imparted on the coating film.
"C": Ballotini remained and scratch marks were imparted on the coating film.

The evaluation results of the coating films of the above coating compositions (1) to (8) are shown in Table 2.

TABLE 2

Coating compositions in Examples and Comparative Examples and their evaluation results

| | Ex. 7 | Ex. 8 | Comp. Ex. 4 | Comp. Ex. 5 |
|---|---|---|---|---|
| Coating composition | (1) | (2) | (3) | (4) |
| Fluorinated copolymer solution | A1 | A4 | A8 | A9 |
| Total molar ratio of piperidyl groups/total molar ratio of monomers (molar ratio) | 0.00313 | 0.00359 | 0.00386 | 0.00467 |
| Cure degree (%) of coating film | A | A | C | C |

| | Ex. 9 | Ex. 10 | Comp. Ex. 6 | Comp. Ex. 7 |
|---|---|---|---|---|
| Coating composition | (5) | (6) | (7) | (8) |
| Fluorinated copolymer solution used | A1 | A4 | A8 | A9 |
| Total molar ratio of piperidyl groups/total molar ratio of monomers (molar ratio) | 0.00313 | 0.00359 | 0.00386 | 0.00467 |
| Surface dryability of coating film | A | A | C | C |

As shown in Table 2, with the fluorinated copolymer solutions A1 and A4 obtained in Examples 1 and 4, the curing properties and dryability of the coating materials were good, and irrespective of presence or absence of a pigment, it was possible to produce coating compositions suitable for site work.

On the other hand, with the fluorinated copolymer solutions A8 and A9 obtained in Comparative Examples 2 and 3, the curing properties and dryability of the coating materials were slow, and they were not suitable for coating compositions to be used for site work.

INDUSTRIAL APPLICABILITY

According to the present invention, it is possible to provide a fluorinated copolymer solution suitable for coating material having good storage stability and having good dryability of a coating film when made into a coating composition, and a coating composition containing such a fluorinated copolymer solution.

What is claimed is:

1. A method for producing a fluorinated copolymer solution, the method comprising polymerizing a monomer mixture comprising a fluoro-olefin (A), a monomer (B) having a crosslinkable group and a monomer (C) having no fluorine atom and no crosslinkable group, in the presence of an organic solvent, and a compound having two or more piperidyl groups to form a fluorinated copolymer solution, wherein the molar ratio of the total molar amount of piperidyl groups contained in the compound to the total molar amount of monomers in the monomer mixture, is from 0.00105 to 0.00380, wherein the compound having two or more piperidyl groups is formula (3):

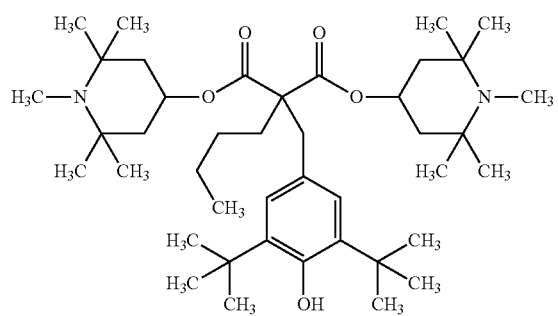

(3)

wherein to the fluorinated copolymer solution obtained is added a polyisocyanate and a curing catalyst to obtain a coating composition and the coating composition is applied as a coating film on a glass substrate, the resulting coating film has a cure degree of at least 70% as determined by the difference of the mass of the coating film before and after being immersed in acetone for 1 hour under reflux.

2. The method for producing a fluorinated copolymer solution according to claim 1, therein to the total molar amount of monomers in the monomer mixture, the content of the fluoro-olefin (A) is from 25 to 70 mol %, the content of the monomer (B) having a crosslinkable group is from 1 to 70 mol %, the content of the monomer (C) having no fluorine atom and no crosslinkable group is from 1 to 70 mol %, and the total content of (A)+(B)+(C) is 100 mol %.

3. The method for producing a fluorinated copolymer solution according to claim 1, wherein the monomer (B) having a crosslinkable group is at least one member selected from the group consisting of an alkyl vinyl ether having a crosslinkable group, an alkyl allyl ether having a crosslinkable group, an alkanoic acid vinyl ester having a crosslinkable group, an alkanoic acid allyl ester having a crosslinkable group, and a (meth)acrylic acid ester having a crosslinkable group.

4. The method for producing a fluorinated copolymer solution according to claim 1, wherein the crosslinkable group is at least one member selected from the group consisting of a hydroxy group, a carboxy group, an epoxy group, an oxetanyl group, an amino group and an alkoxysilyl group.

5. The method for producing a fluorinated copolymer solution according to claim 1, wherein the monomer (C) having no fluorine atom and no crosslinkable group is at least one member selected from the group consisting of an alkyl vinyl ether, an alkyl allyl ether, an alkanoic acid vinyl ester, an alkanoic acid allyl ester and a (meth)acrylic acid alkyl ester.

6. The method for producing a fluorinated copolymer solution according to claim 1, wherein the polymerization is conducted in the presence of a radical polymerization initiator.

7. The method for producing a fluorinated copolymer solution according to claim 6, wherein the radical polymerization initiator is a compound represented by the following formula (5):

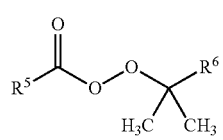

(5)

wherein each of $R^5$ and $R^6$ which are independent of each other, is a $C_{1-12}$ alkyl group or a $C_{6-12}$ aryl group.

8. The method for producing a fluorinated copolymer solution according to claim 7, wherein $R^5$ in the formula (5) is a group represented by the following formula (6):

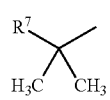

(6)

wherein $R^7$ is a $C_{1-9}$ alkyl group.

9. The method for producing a fluorinated copolymer solution according to claim 1, wherein the organic solvent is at least one member selected from the group consisting of xylene, ethanol, tert-butyl alcohol, acetone, methyl ethyl ketone, methyl isobutyl ketone, ethoxyethyl propionate, cyclohexanone, tert-butyl acetate, chlorobenzene trifluoride, mineral spirits, cyclohexane, ethyl acetate, butyl acetate, HCFC-141b and HCFC-225.

10. The method for producing a fluorinated copolymer solution according to claim 1, wherein
the fluoro-olefin (A) is chlorotrifluoroethylene or tetrafluoroethylene,
the monomer (B) is a hydroxyalkyl vinyl ether,
the monomer (C) is an alkyl vinyl ether or an alkanoic acid vinyl ester,
the content of the fluoro-olefin (A) is from 25 to 70 mol %, the content of the monomer (B) having a crosslinkable group is from 1 to 70 mol %, the content of the monomer (C) having no fluorine atom and no cross-linkable group is from 1 to 70 mol %, and the total content of (A)+(B)+(C) is 100 mol %, and the molar ratio of the total molar amount of piperidyl groups contained in the compound to the total molar amount of monomers in the monomer mixture, is from 0.00115 to 0.00360.

11. The method for producing a fluorinated copolymer solution according to claim 1, wherein-the fluorinated copolymer comprises from 45 to 55 mol % of the monomer unit (A), 3 to 30 mol % of the monomer unit (B), and 30 to 50 mol % of monomer unit (C) and wherein the monomer unit (A) is chlorotrifluorethylene, the monomer unit (B) is hydroxybutyl vinyl ether, and the monomer unit (C) is an alkyl vinyl ether.

* * * * *